(No Model.)
W. BALDWIN.
PLASHED HEDGE FASTENING.
No. 254,187. Patented Feb. 28, 1882.
Witnesses.
F. L. Ouraud
L. L. Miller
Inventor:
William Baldwin,
per Chas. H. Fowler
Attorney.

United States Patent Office.

WILLIAM BALDWIN, OF MARION, INDIANA.

PLASHED-HEDGE FASTENING.

SPECIFICATION forming part of Letters Patent No. 254,187, dated February 28, 1882.

Application filed December 28, 1881. (No model.)

*To all whom it may concern:*

Be it known that I, WILLIAM BALDWIN, a citizen of the United States, residing at Marion, in the county of Grant and State of Indiana, have invented certain new and useful Improvements in Plashed-Hedge Fastenings; and I do hereby declare that the following is a full, clear, and exact description of the same, reference being had to the annexed drawing, making a part of this specification, and to the letters and figures of reference marked thereon.

The present invention has relation to that class of plashed hedges in which the twigs are bent down at or near the surface of the ground and held in such position by a wire or other flexible fastening wrapped around the twigs.

The object of the present invention is to produce an improvement in the devices heretofore employed in connecting the twigs of hedge fences together, which I attain by the construction substantially as shown in the drawing and hereinafter described.

In the accompanying drawing, A represents the twigs or canes, which are suitably trimmed and bent down at an angle to a perpendicular, and secured in such position by a wire or other suitable flexible fastening, B, which is continuous and unbroken throughout the entire length of the fence.

In place of simply wrapping the fastening around the twigs or canes, I form loops, which pass around every two of the twigs, and then form a twist, as shown at *a*, after which the fastening B is carried to the next pair of twigs and passed around them again, forming a twist, and so on throughout the entire length of the fence. The twist *a* in the fastening B comes about midway between each of the twigs, as shown in the drawing, and consequently an equal strain is the result upon each of the twigs. It will therefore be seen that a more perfect and even hedge fence is obtained than heretofore, with less trouble, as the fastening is much easier to apply.

The fastening B is continuous throughout the length of the fence, and each twisted loop embraces two or more of the twigs, holding them in the exact position with relation to each other with much less difficulty, and in case where there are missing twigs or plants the fastening, when looped around the one next following, will draw it down and close up the vacant spaces, thereby preventing small animals from passing through.

Having now fully described my invention, what I claim as new, and desire to secure by Letters Patent, is—

1. In a hedge fence formed as described, the fastening consisting of a continuous wire or cord extending from end to end of the fence and formed into twisted loops, each of which embraces two or more of the inclined twigs, substantially as and for the purpose set forth.

2. The combination, with a hedge fence consisting of twigs or plants bent at an angle, as described, of a continuous wire or cord extending from end to end of the fence and formed into twisted loops, each of which embraces two or more of the twigs or plants, substantially as and for the purpose specified.

In testimony that I claim the above I have hereunto subscribed my name in the presence of two witnesses.

WILLIAM BALDWIN.

Witnesses:
SCOTT LUDLAW,
J. N. McCLEERY.